United States Patent Office 3,600,410
Patented Aug. 17, 1971

3,600,410
1-HYDROXY-4-SULFONAMIDOANILINOANTHRA-QUINONE DISPERSE DYES
Carl Johannes Berninger and Joseph William Fitzpatrick, Toms River, N.J., assignors to Toms River Chemical Corporation, Toms River, N.J.
No Drawing. Filed Apr. 10, 1968, Ser. No. 720,349
Int. Cl. C09b 1/50, 1/52
U.S. Cl. 260—373     5 Claims

ABSTRACT OF THE DISCLOSURE 1-hydroxy - 4 - sulfonamidoanilinoanthraquinone and 1-hydroxy - 4 - carboxamidoanilinoanthraquinone compounds of the general formula

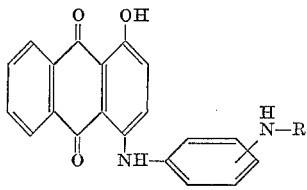

in which R is a sulfonyl or benzoyl radical such as an alkylsulfonyl radical of 1 to 16 carbon atoms, a branched alkylsulfonyl radical of 3 to 5 carbon atoms, a benzenesulfonyl radical, both unsubstituted and substituted, or an unsubstituted or substituted benzoyl radical are valuable dyestuffs for the coloration of aromatic polyester fibers.

BACKGROUND OF THE INVENTION

Polyester fibers present particular dyeing problems, arising at least in part out of the hydrophobic nature of such fibers. In the dyeing of polyester fibers, the class of dyes known as disperse dyestuffs has come to have the widest application. These dyestuffs are essentially water-insoluble products applied in a finely divided condition from a dispersion. In the application of such dyestuffs, the dyeing difficulties associated with polyester fibers have been met by the development of special methods for the application of dispersed dyes to the fibers. Of these methods, the one known as the Pad/Thermofix method has become of increasing importance since it is particularly adapted for high-speed, continuous dyeing operations. In this method, a fabric is padded by passing it through an aqueous suspension of the dyestuff and squeezing the fabric between closely-set rollers in order to remove excess dye liquor. The dyestuff is only loosely attached to the fiber at this point. The dyestuff is then fixed on the fiber by subjecting the material to a short, intensive heat-treatment at elevated temperatures of the order of about 120–220° C. It is evident that a dyestuff, in order to be suitable for application by this method, must be fast to sublimation or else it will wholly or partially volatilize from the fiber during the heat-treatment step.

SUMMARY OF THE INVENTION

In accordance with the present invention, it has been found that valuable dyeings and printings are produced on fibrous materials of aromatic polyesters, especially polyethylene terephthalate, by using as dyestuffs 1-hydroxy - 4 - sulfonamidoanilinoanthraquinone and 1-hydroxy-4-carboxamidoanilinoanthraquinone compounds of the formula

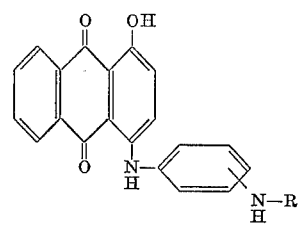

in which R is a benzoyl or a sulfonyl radical, and more particularly, R is an alkylsulfonyl radical of from 1 to 16 carbon atoms, a branched alkyl sulfonyl radical of from 3 to 5 carbon atoms, benzenesulfonyl, substituted benzenesulfonyl, benzoyl or substituted benzoyl. The substituted benzoyl and benzenesulfonyl radicals can contain such substituents as chlorine, bromine, nitro, lower alkyl, i.e. methyl, ethyl, propyl, butyl, and lower alkoxy, i.e. methoxy, ethoxy, propoxy, butoxy. The —NHR group can be in ortho, meta or para position to the anthraquinonylimine on the phenylene ring.

Among the compounds of interest as dyestuffs for polyester fibrous materials, there can be mentioned the following:

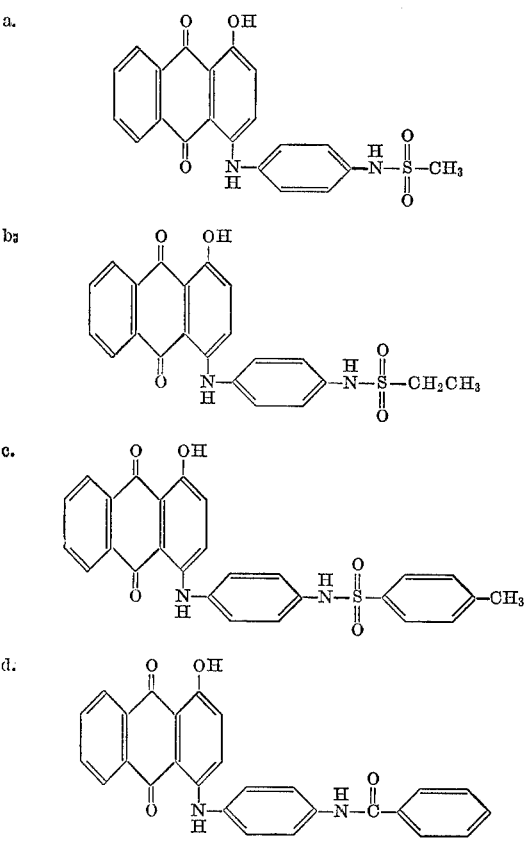

The 1-hydroxy-4-sulfonamidoanilinoanthraquinones and 1-hydroxy-4-benzenecarboxamidoanilinoanthraquinones employed according to the present invention are prepared by reacting a 1-hydroxy-4-aminoanilinoanthraquinone with an alkyl- or aryl-sulfonyl chloride to provide the sulfonamidoanilinoanthraquinones of the present invention or with a benzoyl chloride to provide the carboxamidoanilinoanthraquinone dyestuffs of the present invention.

The reaction is carried out by heating the 1-hydroxy-4-aminoanilinoanthraquinone with the sulfonyl chloride or the benzoyl chloride at a temperature of from about 30 to about 100° C. The sulfonyl or benzoyl chloride is ordinarily employed in a slight molar excess, on the order of about 10% to 40%.

The preparation of the 1-hydroxy-4-sulfonamidoanilinoanthraquinone dyestuffs is desirably carried out in the presence of pyridine which acts both as solvent and as an acid binding agent. Other tertiary bases which can be similarly employed are $\alpha$-picoline, quinoline, dimethylaniline, diethylaniline, triethylamine, dimethylformamide or dimethylacetamide.

The preparation of the 1-hydroxy-4-carboxamidoanilinoanthraquinone dyestuffs is desirably carried out in an inert organic solvent in the presence of an acid binding agent. Suitably, the inert sodvent can be nitrobenbene, monochlorobenzene, dichlorobenzene and the like. Tertiary bases such as pyridine, can be employed as the acid binding agent as well as alkali metal compounds such as alkali metal carbonates, bicarbonates or acetate.

Alternatively, dyestuffs of the present invention can be prepared from nitroaniline by initially reacting nitroaniline with a sulfonyl chloride or a benzoyl chloride, reducing the nitro group of the resulting intermediate to the amine according to known methods for effecting such conversion and then reacting the resulting amino compound with quinizarine to provide the dyestuffs of the present invention.

For dyeing, the said dyestuffs are preferably used in a finely divided form and the dyeing is carried out in the presence of a dispersing agent, such as sulphite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example, by grinding the dyestuff(s) either in dry or wet form with or without the addition of a dispersing agent.

The dyestuffs used in the invention are especially suitable for dyeing by the so-called thermofixation or Pad/Thermofix method, in which the fabric to be dyed is impregnated advantageously at a temperature not exceeding 60° C. with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 120–220° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example, a direct dyestuff or vat dyestuff, or a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used, the padded fabric must be treated, after the heat treatment, with an aqueous alkaline solution of a reducing agent of the kind used in vat dyeing.

The dyeings produced on polyester fibers by the process of the invention are advantageously given an aftertreatment, for example, by heating them with an aqueous solution of a nonionic detergent.

Instead of applying the dyestuffs in the process by impregnation, they may be applied by printing. For this purpose, a printing color is used which, in addition to the usual printing assistants, such as wetting and thickening agents, contains the finely dispersed dyestuff, if desired, in admixture with one of the aforesaid cotton dyestuffs, and, if desired, in the presence of urea and/or an agent capable of binding acid.

There are obtained by the practice of the present invention strong dyeings or prints of attractive shade and good color build-up having excellent fastness properties, especially a good fastness to sublimation and to light. The introduction of permanent crease fabrics has lent still further emphasis to the importance of sublimation fastness since the processes involved in the preparation of such fabrics require the curing at elevated temperatures for prolonged periods of the resin finishes applied for the achievement of permanent crease characteristics. The light fastness properties of the dyes employed according to the present invention are particularly important since many of these dyes provide dyeings in the blue shade range wherein good light fastness has always been difficult to achieve.

The term polyester defines synthetic polymeric polyesters, such as the highly polymeric linear polyesters, the molecules of which have recurring monomeric units connected by ester linkages. Dibasic acids, for example, aromatic acids, such as terephthalic acid, diphenyl-4,4'-dicarboxylic acid and/or diphenylsulfone-4,4'-dicarboxylic acid and dihydroxy compounds, for example, glycols, such as ethylene glycol, diethylene glycol, triethylene glycol, propylene glycol and/or butylene glycol, as well as other diols, such as 1,4-cyclohexyldiol can be used as the monomers to form the polymeric polyesters. Typical commercial examples of such fibers are Dacron, Terylene, Fortrel, Trevira, Terlanca, Kodel, Vicron, etc. They are disclosed for example, in U.S. Pat. No. 2,901,466 and British Pats. Nos. 578,079; 579,462; 588,497 and 596,688.

The present invention is, of course, equally applicable to the dyeing of blends of polyester fibers and cellulosic fibers. The latter term includes native cellulose, such as linen or, more particularly, cotton, as well as regenerated cellulose, such as viscose of cuprammonium rayon. In the thermofix dyeing of polyester-cotton blends, the dyestuffs of the present invention exhibit excellent transfer from the cotton to the polyester portion of the blend. This is advantageous since the polyester portion is dyed stronger and the subsequent dyeing of the cotton portion is simplified because of less staining.

In addition, the dyestuffs of Examples 1 and 2 have been found to be well suited for exhaust dyeing. It is an unusual advantage of these dyestuffs that they possess outstanding sublimation fastness while still being applicable by the exhaust dyeing method in which dyes are applied to polyester fibers from an aqueous dispersion at either about 203° F. at atmospheric pressure or at about 250° F. under slight pressure, employing in either instance a carrier, such as o-phenylphenols.

The following examples illustrate the invention, the parts and percentages being by weight unless otherwise specified.

EXAMPLE 1

66 g. of 1-hydroxy-4-p-aminoanilinoanthraquinone are added to 200 g. of pyridine in a 1-liter flask with good stirring. The mixture is heated to 50° C. in one hour and 25.0 g. of methanesulfonyl chloride are added. The reaction mixture is heated to 100° C., and 0.81 g. of the surfactant Nekal BX, a sodium alkylnaphthalene sulfonate, are added. Excess pyridine is removed by steam distillation and the product recovered by filtration. The product is washed with hot water until its chloride free and dried in the vacuum oven.

The product obtained in a yield of 73.5 g. has the formula

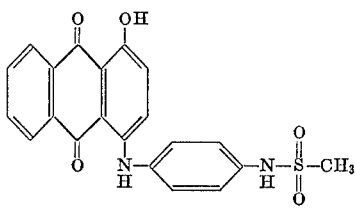

The dyestuff so obtained dyes polyester fibers a bright reddish-blue with excellent light and sublimation fastness properties.

Following the procedure described hereinbefore and using the intermediates indicated hereinafter in Table I, the following compounds and shades on polyester fabric are obtained. All of these dyeings exhibit good to excellent sublimation and light fastness.

TABLE I

| Anthraquinone derivative | Alkyl sulfonyl chloride | Anthraquinone product | Shade |
|---|---|---|---|
| 1-hydroxy-4-p-aminoanilino. | Ethane | 1-hydroxy-4-p-ethanesulfonamidoanilino. | Reddish-blue. |
| Do | Butane | 1-hydroxy-4-p-butanesulfonamidoanilino. | Do. |
| Do | Hexadecane. | 1-hydroxy-4-p-hexadecanesulfonamidoanilino. | Do. |
| 1-hydroxy-4-m-aminoanilino. | Methane | 1-hydroxy-4-m-methanesulfonamidoanilino. | Do. |
| 1-hydroxy-4-o-aminoanilino. | do | 1-hydroxy-4-o-methanesulfonamidoanilino. | Do. |
| 1-hydroxy-4-p-aminoanilino. | 3-methyl-1-butane. | 1-hydroxy-4-p-[3-methyl-1-butanesulfonamido]-anilino. | Do. |

EXAMPLE 2

33 g. 1-hydroxy-4-p-aminoanilinoanthraquinone are added to 300 g. of pyridine and the mixture is stirred for half an hour. At 30° C. 22.8 g. of p-toluenesulfonyl chloride are added and stirring continued until thin layer chromatography establishes that the reaction is complete. The excess pyridine is removed by steam distillation and the product filtered. The cake is washed free of chloride with hot water and dried.

The product, obtained in a yield of 42 g., has the formula

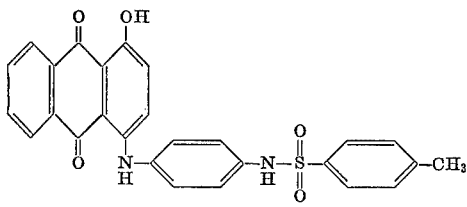

Following the procedure described hereinbefore and using the intermediates indicated hereinafter in Table II, the following compounds and shades on polyester fabric are obtained. All of these dyeings exhibit good to excellent sublimation and light fastness.

TABLE II

| Anthraquinone derivative | Benzenesulfonyl chloride | Anthraquinone product | Shade |
|---|---|---|---|
| 1-hydroxy-4-p-aminoanilino. | p-Chloro | 1-hydroxy-4-p-(p-chlorobenzenesulfonamido)-anilino. | Reddish-blue. |
| Do | Unsubstituted. | 1-hydroxy-4-p-benzenesulfonamidoanilino. | Do. |
| Do | m-Nitro | 1-hydroxy-4-p-(m-nitrobenzenesulfonamido)-anilino. | Do. |
| Do | p-Bromo | 1-hydroxy-4-p-(p-bromobenzenesulfonamido)-anilino. | Do. |
| Do | 3,4-dichloro. | 1-hydroxy-4-p-(3,4-dichlorobenzenesulfonamido)-anilino. | Do. |
| Do | p-Methoxy | 1-hydroxy-4-p(p-methoxybenzenesulfonamido)-anilino. | Do. |
| 1-hydroxy-4-m-aminoanilino. | Unsubstituted. | 1-hydroxy-4-m-benzenesulfonamidoanilino. | Do. |
| 1-hydroxy-4-o-aminoanilino. | do | 1-hydroxy-4-o-benzenesulfonamidoanilino. | Do. |
| 1-hydroxy-4-p-aminoanilino. | o-Methyl | 1-hydroxy-4-p(o-methylbenzenesulfonamido)-anilino. | Do. |
| Do | m-Methyl | 1-hyrdoxy-4-p-(m-methylbenzenesulfonamido)-anilino. | Do. |
| Do | 2,5-dimethyl. | 1-hydroxy-4-p-(2,5-dimethylbenzenesulfonamido)-anilino. | Do. |

EXAMPLE 3

To 300 g. monochlorobenzene are added 16.5 g. of 1-hydroxy-4-p-aminoanilinoanthraquinone, 20 g. of pyridine, and 10 g. of benzoyl chloride. The reaction mixture is heated to reflux in 1 hour and held for 3 hours with good stirring. When the reaction is complete, as determined by thin layer chromatography the mixture is cooled to 100° C., 1 g. of Nekal BX, a sodium alkylnaphthalene sulfonate, is added, and the mixture is steam distilled until free of pyridine and monochlorobenzene. The slurry is filtered and washed with hot water.

The product, obtained in a yield of 21 g., has the formula

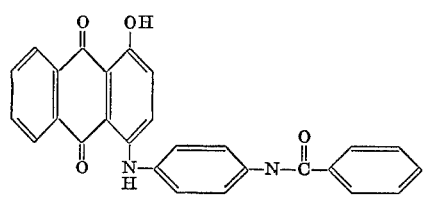

Following the procedure described hereinbefore and using the intermediates indicated hereinafter in Table III, the following compounds and shades on polyester fabric are obtained. All of these dyeings exhibit good to excellent sublimation and light fastness.

TABLE III

| Anthraquinone derivative | Benzoyl-chloride | Anthraquinone product | Shade |
|---|---|---|---|
| 1-hydroxy-4-p-aminoanilino. | o-Chloro | 1-hydroxy-4-p-(o-chlorobenzenecarboxamido)-anilino. | Blue. |
| Do | p-Chloro | 1-hydroxy-4-p-(p-chlorobenzenecarboxamido)-anilino. | Do. |
| Do | 2,4-dichloro | 1-hydroxy-4-p-(2,4-dichlorobenzenecarboxamido)-anilino. | Do. |
| Do | 3,4-dichloro. | 1-hydroxy-4-p-(3,4-dichlorobenzenecarboxamido)-anilino. | Do. |
| Do | p-Nitro | 1-hydroxy-4-p-(p-nitrobenzenecarboxamido)-anilino. | Do. |
| Do | m-Nitro | 1-hydroxy-4-p-(m-nitrobenzenecarboxamido)-anilino. | Do. |
| Do | o-Methoxy | 1-hydroxy-4-p-(o-methoxybenzenecarboxamido)-anilino. | Do. |
| 1-hydroxy-4-m-aminoanilino. | Unsubstituted. | 1-hydroxy-4-m-benzenecarboxamidoanilino. | Do. |
| 1-hydroxy-4-o-aminoanilino. | do | 1-hydroxy-4-o-benzenecarboxamidoanilino. | Do. |

We claim:
1. A compound of the formula

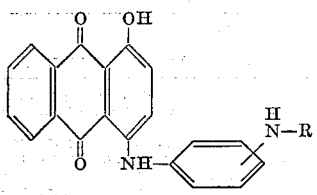

wherein R is a member selected from the group consisting of alkylsulfonyl radical of 1-16 carbon atoms, branched alkylsulfonyl radical of 3-5 carbon atoms, benzenesulfonyl and substituted benzenesulfonyl wherein the substituent is selected from the group consisting of chlorine, bromine, nitro, lower alkyl and lower alkoxy.

2. A compound of the formula

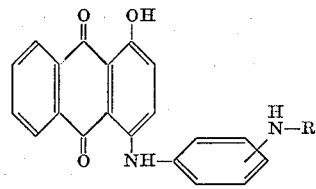

wherein R is selected from the group consisting of benzenesulfonyl and substituted benzenesulfonyl wherein the substituent is selected from the group consisting of chlorine, bromine, nitro, lower alkyl and lower alkoxy.

3. A compound according to claim 1 having the formula

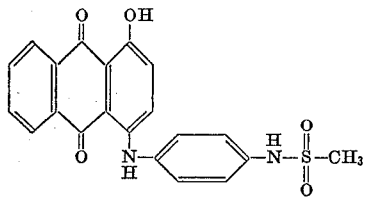

4. A compound according to claim 1 having the formula

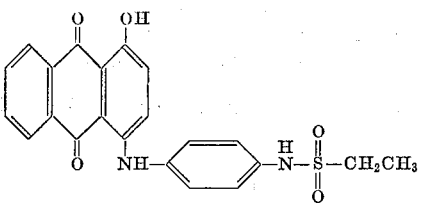

5. A compound according to claim 2 having the formula

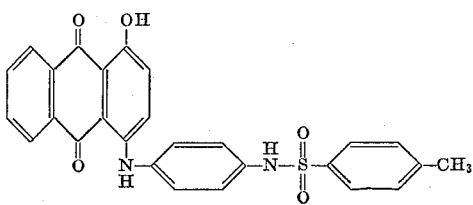

References Cited
UNITED STATES PATENTS

| | | | |
|---|---|---|---|
| 2,894,800 | 7/1959 | Guenthard et al. | 260—377 |
| 3,036,078 | 5/1962 | Grossmann et al. | 260—377 |
| 3,446,817 | 5/1969 | Harvey et al. | 260—377 |
| 2,053,275 | 9/1936 | Ellis et al. | 260—377 |

LEWIS GOTTS, Primary Examiner
E. J. SKELLY, Assistant Examiner

U.S. Cl. X.R.
8—39, 40; 260—377